United States Patent
Shao et al.

(10) Patent No.: US 12,235,633 B2
(45) Date of Patent: Feb. 25, 2025

(54) INDUSTRIAL INTERNET OF THINGS FOR DETERMINING TARGET AUTOMATIC GUIDED VEHICLE (AGV) PATH, CONTROL METHOD, AND STORAGE MEDIUM THEREOF

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Yong Li, Chengdu (CN); Lei Zhang, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/583,841

(22) Filed: Feb. 21, 2024

(65) Prior Publication Data

US 2024/0192670 A1 Jun. 13, 2024

Related U.S. Application Data

(63) Continuation of application No. 18/295,245, filed on Apr. 3, 2023, now Pat. No. 11,994,850.

(30) Foreign Application Priority Data

Aug. 16, 2022 (CN) .......................... 202210979555.X

(51) Int. Cl.
G05B 19/418 (2006.01)
(52) U.S. Cl.
CPC ... G05B 19/41895 (2013.01); G05B 19/4185 (2013.01); G05B 2219/31005 (2013.01)

(58) Field of Classification Search
CPC .................. G05B 19/41895; G05B 19/4185
See application file for complete search history.

(56) References Cited

U.S. PATENT DOCUMENTS

| 6,842,425 B1 * | 1/2005 | Mannepalli | ............. H04L 45/12 |
| | | | 370/255 |
| 2014/0088763 A1 * | 3/2014 | Hazan | .................... B25J 9/1666 |
| | | | 700/255 |

(Continued)

FOREIGN PATENT DOCUMENTS

| CN | 107990903 A | 5/2018 |
| CN | 109409940 A | 3/2019 |

(Continued)

OTHER PUBLICATIONS

First Office Action in Chinese Application No. 202210979555.X mailed on Sep. 21, 2022, 13 pages.

(Continued)

*Primary Examiner* — Sohana Tanju Khayer
(74) *Attorney, Agent, or Firm* — Porus IP LLC

(57) ABSTRACT

An industrial internet of things for determining a target automatic guided vehicle (AGV) path, a control method, and a storage medium are provided. The industrial internet of things comprises a service platform, a management platform and a sensor network platform which are connected in sequence. The management platform comprises: an obtaining module configured to obtain an AGV route layout of a target workshop through the sensor network platform, and generate a basic layout directed graph according to the AGV route layout; and a determination module configured to determine, based on the basic layout directed graph, an optimal AGV path through a second iteration approach; generate a target AGV path at least based on the optimal AGV path; and control an AGV to carry out material (Continued)

transportation according to the target AGV path, and send the target AGV path to the user platform for display to a user.

19 Claims, 6 Drawing Sheets

(56) References Cited

U.S. PATENT DOCUMENTS

| | | | | |
|---|---|---|---|---|
| 2017/0185928 | A1* | 6/2017 | Zhou | G06Q 10/047 |
| 2018/0330258 | A1* | 11/2018 | Harris | G06N 7/01 |
| 2018/0354893 | A1* | 12/2018 | Wurman | G05B 19/4189 |
| 2020/0333789 | A1* | 10/2020 | Suzuki | G05D 1/0212 |
| 2021/0046650 | A1* | 2/2021 | Deyle | G05D 1/0214 |
| 2021/0069905 | A1* | 3/2021 | Zhang | B25J 9/1664 |
| 2021/0072029 | A1* | 3/2021 | Marques | G01C 21/206 |
| 2021/0223049 | A1 | 7/2021 | Johnson et al. | |
| 2021/0335630 | A1 | 10/2021 | Jang et al. | |
| 2022/0163969 | A1 | 5/2022 | Li | |
| 2023/0131553 | A1* | 4/2023 | Zhang | G01C 21/3446 701/26 |
| 2023/0149882 | A1* | 5/2023 | Cronin | B01J 19/004 435/287.1 |
| 2023/0227066 | A1* | 7/2023 | Templer | G01C 21/3819 701/23 |

FOREIGN PATENT DOCUMENTS

| | | |
|---|---|---|
| CN | 110045731 A | 7/2019 |
| CN | 110221601 A | 9/2019 |
| CN | 113093758 A | 7/2021 |
| CN | 114326608 A | 4/2022 |
| KR | 20210053090 A | 5/2021 |

OTHER PUBLICATIONS

Decision to grant a patent in Chinese Application No. 202210979555.X mailed on Oct. 19, 2022, 7 pages.

"Detailed Ant Colony Algorithm", Web page <https://cloud.tencent.com/developer/article/1704718>, Sep. 24, 2020.

Sun, Wei et al., Mobile Robot Path Planning Based on an Improved A* Algorithm, Journal of Hunan University (Natural Sciences), 44(4): 94-101, 2017.

Chen, Huawei et al., Material Logistic Simulation Control Technology Based on Dynamic Path Planning, Journal of System Simulation, 21(21): 6798-6802, 2009.

* cited by examiner

100

500

Attributes of
edges:
Length c
Feature array d

Traffic correlation degree (t=0): 0.1

INDUSTRIAL INTERNET OF THINGS FOR DETERMINING TARGET AUTOMATIC GUIDED VEHICLE (AGV) PATH, CONTROL METHOD, AND STORAGE MEDIUM THEREOF

CROSS-REFERENCE

This application is a continuation of U.S. application Ser. No. 18/295,245, filed on Apr. 3, 2023, which claims the priority of Chinese patent application No. 202210979555.X, filed on Aug. 16, 2022, the entire content of each of which is incorporated herein by reference.

TECHNICAL FIELD

The present disclosure relates to intelligent manufacturing technology, and in particular, to an industrial Internet of Things for determining a target automatic guided vehicle (AGV) path, a control method, and a storage medium.

BACKGROUND

AGV refers to a transport vehicle equipped with electromagnetic or optical automatic navigation devices, which can travel along a prescribed navigation path, and has safety protection and various transfer functions. In industrial applications, the driver's truck is not required, and the rechargeable battery is used as its power source. Generally, its travel path and behavior can be controlled by a computer, or an electromagnetic track can be used to set up its travel path. The electromagnetic track is pasted on the floor, and the unmanned guided vehicle relies on the information brought by the electromagnetic track to move and act.

On a super-large-scale production line, obstacles on a section of AGV route may affect the transportation routes of a plurality of AGVs; and temporarily re-planning the AGV route may incur a lot of time cost and affect the efficiency of the production line.

SUMMARY

One of the embodiments of the present disclosure provides an Industrial Internet of Things for determining a target automatic guided vehicle (AGV) path, comprising a user platform, a service platform, a management platform and a sensor network platform which are connected in sequence, the management platform comprises: an obtaining module configured to obtain an AGV route layout of a target workshop through the sensor network platform, and generate a basic layout directed graph according to the AGV route layout; and a determination module configured to: determine, based on the basic layout directed graph, an optimal AGV path through a second iteration approach; the second iteration approach including at least one round of second iteration, one round of the at least one round of second iteration including at least one decision-making entity, and one round of the at least one round of second iteration including: for any decision-making entity, determining, based on a transportation obstacle situation when moving from a kth node to second connected nodes, a connected node transition probability from the kth node to each of the second connected nodes, where k denotes an integer greater than or equal to 1, a first node corresponds to a material start point, the kth node corresponds to at least one of the second connected nodes, the each of the second connected nodes corresponds to a connected node transition probability, and the each of the second connected nodes does not include a node that the decision-making entity has passed; determining a second connected node with a largest connected node transition probability as a (k+1)th node, the kth node to the (k+1)th node being connected by at least one first edge; determining, based on a transportation obstacle situation of the at least one first edge, a first edge transition probability of the at least one first edge, each first edge corresponding to a first edge transition probability; taking a first edge with a largest first edge transition probability as a first transition route of the kth node to the (k+1)th node until the (k+1)th node corresponds to a material end point, the decision-making entity returning to the material start point along a second transition route from the material start point to the material end point, the second transition route being composed of the first transition route; updating pheromone of all the nodes and pheromone of all the edges, the pheromone being mark information left by the decision-making entity when passing the second transition route, the pheromone of the nodes being used to determine the connected node transition probability, and the pheromone of the edges being used to determine the first edge transition probability; and after the second iteration, determining the optimal AGV path based on final pheromone of all the nodes and final pheromone of all the edges; generate a target AGV path at least based on the optimal AGV path; and control an AGV to carry out material transportation according to the target AGV path, and send the target AGV path to the user platform for display to a user through the service platform.

One of the embodiments of this disclosure provides a control method of an Industrial Internet of Things for determining a target automatic guided vehicle (AGV) path implemented by a management platform of an Industrial Internet of Things for determining a target automatic guided vehicle (AGV) path; the control method comprises: obtaining an AGV route layout of a target workshop through the sensor network platform, and generating a basic layout directed graph according to the AGV route layout; determining, based on the basic layout directed graph, an optimal AGV path through a second iteration approach; the second iteration approach including at least one round of second iteration, one round of the at least one round of second iteration including at least one decision-making entity, and one round of the at least one round of second iteration including: for any decision-making entity, determining, based on a transportation obstacle situation when moving from a kth node to second connected nodes, a connected node transition probability from the kth node to each of the second connected nodes, where k denotes an integer greater than or equal to 1, a first node corresponds to a material start point, the kth node corresponds to at least one of the second connected nodes, the each of the second connected nodes corresponds to a connected node transition probability, and the each of the second connected nodes does not include a node that the decision-making entity has passed; determining a second connected node with a largest connected node transition probability as a (k+1)th node, the kth node to the (k+1)th node being connected by at least one first edge; determining, based on a transportation obstacle situation of the at least one first edge, a first edge transition probability of the at least one first edge, each first edge corresponding to a first edge transition probability; taking a first edge with a largest first edge transition probability as a first transition route of the kth node to the (k+1)th node until the (k+1)th node corresponds to a material end point, the decision-making entity returning to the material start point along a second transition route from the material start point to the material end point, the second transition route being composed of the first transition route; updating pheromone of all the nodes and pheromone of all the edges, the pheromone being mark information left by the decision-making entity when passing the second transition route, the pheromone of the nodes being used to determine the connected node transition probability, and the pheromone of the edges being used to determine the first edge transition probability; and after the second iteration, determining the optimal AGV path based on final pheromone of all the nodes and final pheromone of all the edges; generating a target AGV path at least based on the optimal AGV path; and controlling an AGV to carry out material transportation according to the target AGV path, and sending the target AGV path to the user platform for display to a user through the service platform.

One of the embodiments of this disclosure provides a non-transitory computer readable storage medium, where the storage medium stores computer instructions, and when the computer instructions are executed by a processor, the foregoing control method is implemented.

Compared with the prior art, the present disclosure has the following advantages and beneficial effects:

According to the industrial Internet of Things for determining a target automatic guided vehicle (AGV) path, the control method, and the storage medium, the selection efficiency of a new route in the event of material transportation obstacles can be effectively improved by classifying, planning and calculating intermediate paths. In addition, the data redundancy is low, the calculation cost and the time cost are low, and the impact of material transportation obstacles on material loading on an ultra-large-scale production line is reduced.

BRIEF DESCRIPTION OF THE DRAWINGS

The present disclosure will be further described by way of exemplary embodiments, which will be described in detail with reference to the accompanying drawings. These embodiments are not limiting, and in these embodiments, the same numbers refer to the same structures.

DETAILED DESCRIPTION

Figure 1:
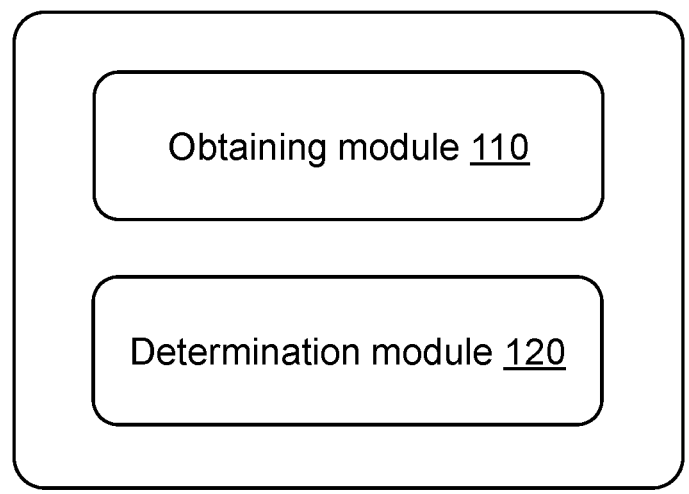
FIG. 1 is an exemplary block diagram of the Industrial Internet of Things based on identification of material transportation obstacles according to some embodiments of the present disclosure.

In order to illustrate the technical schemes of the embodiments of the present disclosure more clearly, the following briefly introduces the accompanying drawings used in the description of the embodiments. Obviously, the accompanying drawings in the following description are only some examples or embodiments of the present disclosure. For ordinary technicians skilled in the art, without creative efforts, the present disclosure can also be applied to other similar situations according to these accompanying drawings. Unless obvious from the locale or otherwise specified, the same reference numbers in the drawings represent the same structure or operation.

It is to be understood that "system", "device", "unit" and/or "module" as used herein is a method used to distinguish different components, elements, parts, portions or assemblies at different levels. However, other words may be replaced by other expressions if they serve the same purpose.

As shown in the specification and claims, unless the context clearly dictates otherwise, the words "a", "an", and/or "the" are not intended to be specific in the singular form but include the plural form; otherwise, the plural form also includes the singular form. Generally speaking, the terms "comprising" and "including" only imply that the clearly identified steps and elements are included, and these steps and elements do not constitute an exclusive list, and the method or equipment may also include other steps or elements.

Flowcharts are used in this disclosure to illustrate operations performed by the system according to the embodiment of this disclosure. It should be understood that the preceding or following operations are not necessarily performed in the exact order. Instead, the various steps can be processed in reverse order or simultaneously. At the same time, other operations can be added to these procedures, or a step or steps can be removed from these procedures.

FIG. 1 is an exemplary block diagram of the Industrial Internet of Things based on identification of material transportation obstacles according to some embodiments of the present disclosure. As shown in FIG. 1, in some embodiments, a management platform system 100 may comprise an obtaining module 110 and a determination module 120.

The Industrial Internet of Things based on identification of material transportation obstacles comprises a user platform, a service platform, a management platform and a sensor network platform which are connected in sequence. The management platform comprises the obtaining module and the determination module. For more details about the contents of the management platform, please refer to FIG. 2 and related description thereof.

The obtaining module 110 is configured to obtain an AGV route layout of a target workshop through the sensor network platform, and generate a basic layout directed graph according to the AGV route layout.

The target workshop refers to a production workshop that needs to be applied to an AGV loading vehicle. For example, a workshop A needs to use the AGV loading vehicle to transport products, and the workshop A is a target workshop.

The AGV route layout refers to a path that the AGV loading vehicle may travel through.

The basic layout directed graph refers to a directed graph formed by extracting nodes and edges according to the AGV route layout and combining the nodes and the edges. For example, a material start point A, a material end point J, and intersection points B and C of the AGV route may be obtained as the nodes of the directed graph according to the AGV route layout of the workshop A, the AGV route connecting the two nodes may be used as an edge, and the direction is from the material start point A to the material end point J, and all the nodes and the corresponding dges are combined to establish the basic layout directed graph of the workshop A.

In some embodiments, the intersection points and the material start point and the material end point in the AGV route layout of the target workshop may be extracted as the nodes in the directed graph. All paths in the AGV route layout of the target workshop are extracted as the edges of the directed graph. For more details about the basic layout directed graph, please refer to FIG. 4 and related description thereof.

The determination module 120 is configured to determine a target AGV path, control the AGV to carry out material transportation according to the target AGV path, and send the target AGV path to the user platform for display to the user through the service platform.

In some embodiments, the target AGV path may comprise alternative AGV paths. In some embodiments, the target AGV path may also comprise an optimal AGV path.

In some embodiments, as for the alternate AGV paths, the intermediate paths may be classified into a plurality of path categories according to the feeding effects of the intermediate paths on the basic layout directed graph. In addition, a plurality of preprocessed layout directed graphs corresponding to the path categories are calculated according to the basic layout directed graph and the path categories, and the operation paths of the AGV are planned and obtained in all the preprocessed layout directed graphs as the alternative AGV paths. For more details about the alternative AGV paths, please refer to FIG. 2-FIG. 3 and related description thereof.

In some embodiments, the optimal AGV path may be determined by a preset algorithm based on the basic layout directed graph. For more details about the optimal AGV path, please refer to FIG. 4-FIG. 6 and related description thereof.

In some embodiments, a processor may control the AGV to carry out material transportation according to the target AGV path, and send the target AGV path to the user platform for display to the user through the service platform. For more details about controlling the AGV to carry out material transporation according to the target AGV path, and sending the target AGV path to the user platform for display to the user through the service platform, please refer to FIG. 2-FIG. 3 and related description thereof.

In some embodiments of this disclosure, the basic layout directed graph of the target workshop is generated by the Industrial Internet of Things based on identification of material transportation obstacles, so as to determine the target AGV path and control the AGV to carry out material transportation according to the target AGV path. The phenomenon of congestion in the process of material transportation can be greatly reduced, and the transportation distance is also considered, which can greatly improve the transportation efficiency.

It should be noted that the above description of the system and modules thereof is only for the convenience of description, and does not limit the disclosure to the scope of the illustrated embodiments. It can be understood that for tehnicians skilled in the art, after understanding the principle of the system, various modules may be combined arbitrarily, or a subsystem may be formed to connect with other modules without departing from the principle. For example, the obtaining module and the determination module may be integrated in one module. As another example, each module may share one storage equipment, and each module may also have its own storage equipment. Such variations are all within the protection scope of this disclosure.

Figure 2:
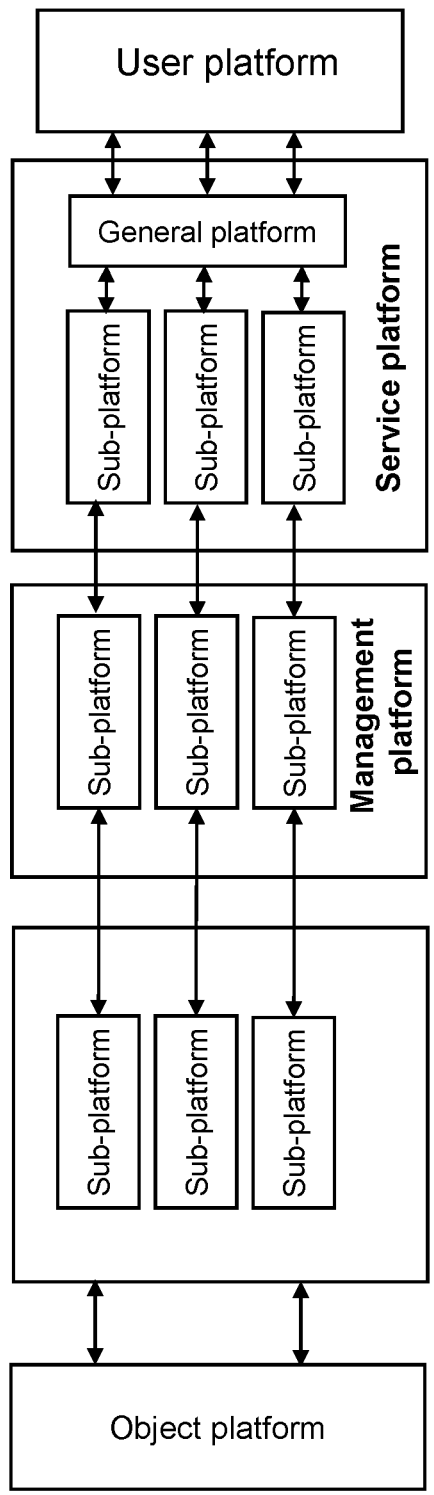
FIG. 2 is a schematic diagram of an industrial Internet of Things system structure based on identification of material transportation obstacles according to some embodiments of the present disclosure.
Figure 2:
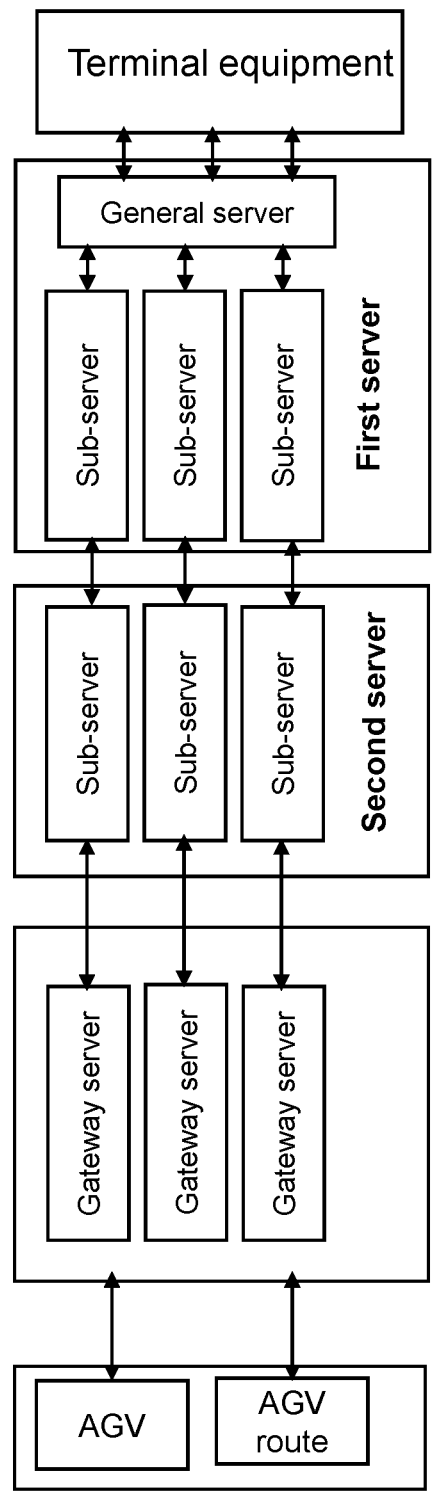

In order to facilitate the above-mentioned Industrial Internet of Things based on identification of material transportation obstacles, please refer to FIG. 2, which provides a schematic diagram of a communication frame of the Industrial Internet of Things based on identification of material transportation obstacles. The Industrial Internet of Things based on identification of material transportation obstacles may comprise an object platform, a sensor network platform, a management platform, a service platform and a user platform which are connected in sequence, and the management platform comprises:

an obtaining module configured to obtain the AGV route layout of the target workshop through the sensor network platform, and generate the basic layout directed graph according to the AGV route layout;

a selection module configured to select all intermediate paths from the basic layout directed graph; the intermediate paths being edges of the basic layout directed graph whose endpoints are not the material end point and the material start point;

a classification module configured to classify the intermediate paths into a plurality of path categories according to the feeding effects of the intermediate paths on the basic layout directed graph;

a calculation module configured to calculate a plurality of preprocessed layout directed graphs corresponding to the path categories according to the basic layout directed graph and the path categories; the preprocessed layout directed graphs are directed graphs obtained by excluding all the intermediate paths in one corresponding one path category from the basic layout directed graph;

a planning module configured to plan the operation paths of the AGV as alternative AGV paths in all the preprocessed layout directed graphs;

a control module configured to use the intermediate path as a fault path if any intermediate path is detected to have material transportation obstacles during the operation of the AGV; select the alternative AGV path corresponding to the faulty path, and control the AGV to carry out material transportation according to the selected alternative AGV path; and a communication module configured to send the material transportation obstacles, the fault path and the selected alternative AGV path to the user platform for display to the user through the service platform.

When the embodiments of the present disclosure are implemented, the implementation is based on the five-platform structure proposed by the inventor. The user platform is terminal equipment that displays information to the user and receives a user instruction, and the object platform comprises AGV routes and AGV terminals. The sensor network platform adopts at least one gateway server, the management platform adopts a second server, and the service platform adopts a first server. The first server and the second server may adopt a single server or a server cluster, which is not limited in this embodiment of the present disclosure. It should be understood that, the data processing process mentioned in this embodiment may be processed by the processor of the server. The data stored in the server may be stored in the storage equipment of the server, such as a hard disk and other storage. In specific applications, the sensor network platform may use a plurality of sets of gateway servers or a plurality of sets of smart routers, which are not limited here. It should be understood that, the data processing process mentioned in the embodiment of this disclosure may be processed by the processor of the gateway server. The data stored in the gateway server may be stored in the storage equipment of the gateway server, such as a hard disk, an SSD and other storage.

In the embodiment of the present disclosure, it can be applied to an ultra-large-scale production line, and the operation routes of all AGVs are planned before the production line is started. After the production line is started, the AGVs operate according to the planned operation routes. It is necessary to obtain the basic layout directed graph, so that the AGVs still operate normally when the AGV routes encounter obstacles. In the basic layout directed graph, the nodes comprise the intersection points of the AGV routes, the material start point, and the material end point, the edges are the AGV routes, and the weights of the edges are the length of the edges.

In the embodiment of the present application, in order to improve the accuracy of subsequent operations, the paths directly connected to the material end point and the material start point need to be eliminated. Because these paths only affect the corresponding material end point and material start point, the embodiment of the present disclosure proposes the concept of intermediate paths. However, in practice, the inventor found that there are a large number of intermediate paths in the ultra-large-scale production line. If a set of avoidance plans is made for each intermediate path, a large amount of model data will be generated. On the one hand, the operation cost in the early stage is very high, and on the other hand, the speed of traversal retrieval may be greatly affected in the later use. Therefore, in the embodiment of the present disclosure, the intermediate paths are classified according to the feeding effects, and the purpose is to classify the intermediate paths with similar feeding effects into the same path category.

In the embodiment of the present disclosure, in order to calculate the interruption situation corresponding to each type of path category, it is necessary to eliminate the intermediate path corresponding to a certain path category from the basic layout directed graph to generate a preprocessed layout directed graph and then calculate the alternative AGV path. Each alternative AGV path corresponds to a path category. Since the feeding effects corresponding to the same path category are similar, most of the AGV paths are not affected when the calculation of the alternative AGV paths is performed in the preprocessed layout directed graph, and the calculation results are very easy to converge.

In the embodiment of the present disclosure, if there are material transportation obstacles, the alternative AGV path corresponding to the fault path may be retrieved, and the material transportation may be continued. The material transportation obstacles may be an error of the AGV itself, or there may be obstacles on the route, etc., which are not limited in the embodiments of the present disclosure. The embodiment of the present disclosure effectively improves the selection efficiency of new routes in the event of material transportation obstacles by classifying, planning and calculating the intermediate routes. In addition, the data redundancy is low, the calculation cost and the time cost are low, and the impact of the material transportation obstacles on material loading on the ultra-large-scale production line is reduced.

In one possible embodiment, the classification module is further configured to:
obtain the shortest distance between the intermediate paths and all key nodes in the basic layout directed graph as a feature array corresponding to the intermediate paths; the key nodes comprising the material end point and the material start point; and
perform cluster analysis on all the intermediate paths according to the feature array to divide the intermediate paths into a plurality of path categories.

When the embodiment of the present disclosure is implemented, the feeding effects of the intermediate paths are mainly reflected by the distance between the intermediate paths and the key nodes, and the closer the distance is, the greater the effects is generally; however, since the number of he key nodes on the ultra-large-scale production line is often relatively large, the embodiment of the present disclosure adopts an unsupervised learning clustering algorithm to perform classification calculation, so as to ensure the accuracy of classification. It should be understood that the clustering algorithm in the embodiment of the present disclosure should construct a corresponding clustering space and a clustering kernel function as required, and the specific process is not limited in the embodiment of the present disclosure. The categories obtained by clustering are a plurality of path categories, which may be used for subsequent calculation.

Exemplarily, establishing a clustering space $G\{g1, g2, \ldots gn\}$ according to the shortest distance to all the key nodes in the basic layout directed graph; the feature array corresponding to the intermediate paths is $Gi\{g1i, g2i, \ldots gni\}$, i is the number of the intermediate paths, and $gni$ is the shortest distance from the intermediate path i to the key node n, which may be obtained by a shortest path search algorithm. After the corresponding multi-dimensional clustering kernel function is constructed, the clustering operation is performed, and the intermediate paths may be clustered into a plurality of categories; when the preprocessed layout directed graphs are generated, all the intermediate paths in a category are eliminated from the basic layout directed graph to form a preprocessed layout directed graph corresponding to the category.

In one possible embodiment, the classification module is further configured to:
establish intermediate nodes at midpoints of the intermediate paths; and
calculate the shortest distances between the intermediate nodes and all the key nodes, and mark all the shortest distances corresponding to the intermediate nodes according to the numbers of the key nodes to form the feature array.

When this embodiment of the present disclosure is implemented, in order to accurately define the shortest distance, the shortest distance is calculated based on the midpoints of the intermediate paths, rather than the shortest distance calculated from the endpoints of the intermediate paths, which is equivalent to adding nodes to the directed graph, and facilitates the calculation.

In one possible embodiment, the control module is further configured to:
monitor a load change of the AGV in operation;
when the load change exceeds a threshold and the AGV is not at the material end point and the material start point, determine that the AGV dropps goods, and determine that the intermediate path where the AGV is currently located has an obstacle in material transportation; and
when the AGV detects that there is an obstacle on an advancing route, determine that the intermediate path where the AGV is currently located has an obstacle in material transportation.

When the embodiment of the present disclosure is implemented, in order to determine the obstacle state in material transportation, two detection methods are provided; one of the detection methods determines that the AGV drops goods through the load change of the AGV load, and the other detection method is realized through the detection of the AGV's own detection equipment, such as infrared, ultrasonic, microwave radar and other equipment. It should be understood that, for the production line, it is necessary to deal with the material transportation obstacles in time.

In one possible embodiment, the planning module is further configured to:

use an ant colony algorithm to plan the operation paths of the AGV in all the preprocessed layout directed graphs.

In one possible embodiment, the sensor network platform comprises a plurality of mutually independent sensor network sub-platforms;

the different sensor network sub-platforms are configured to obtain different types of data on the AGV and the AGV routes and send the data to the management platform.

When this embodiment of the present disclosure is implemented, the different sensor network sub-platforms obtain data such as AGV route layout, AGV position, and AGV load, respectively.

In one possible embodiment, the management platform comprises a plurality of independent sub-servers;

The obtaining module, the selection module, the classification module, the calculation module, the planning module, the control module and the communication module are all arranged in the same sub-server.

In one possible embodiment, the service platform comprises a general service platform and a plurality of service sub-platforms;

the service sub-platforms are configured to receive at least one of the material transportation obstacles, the fault path, and the selected alternative AGV path;

the general service platform is configured to aggregate all the data collected by the service sub-platforms and send the data to the user platform.

Figure 3:
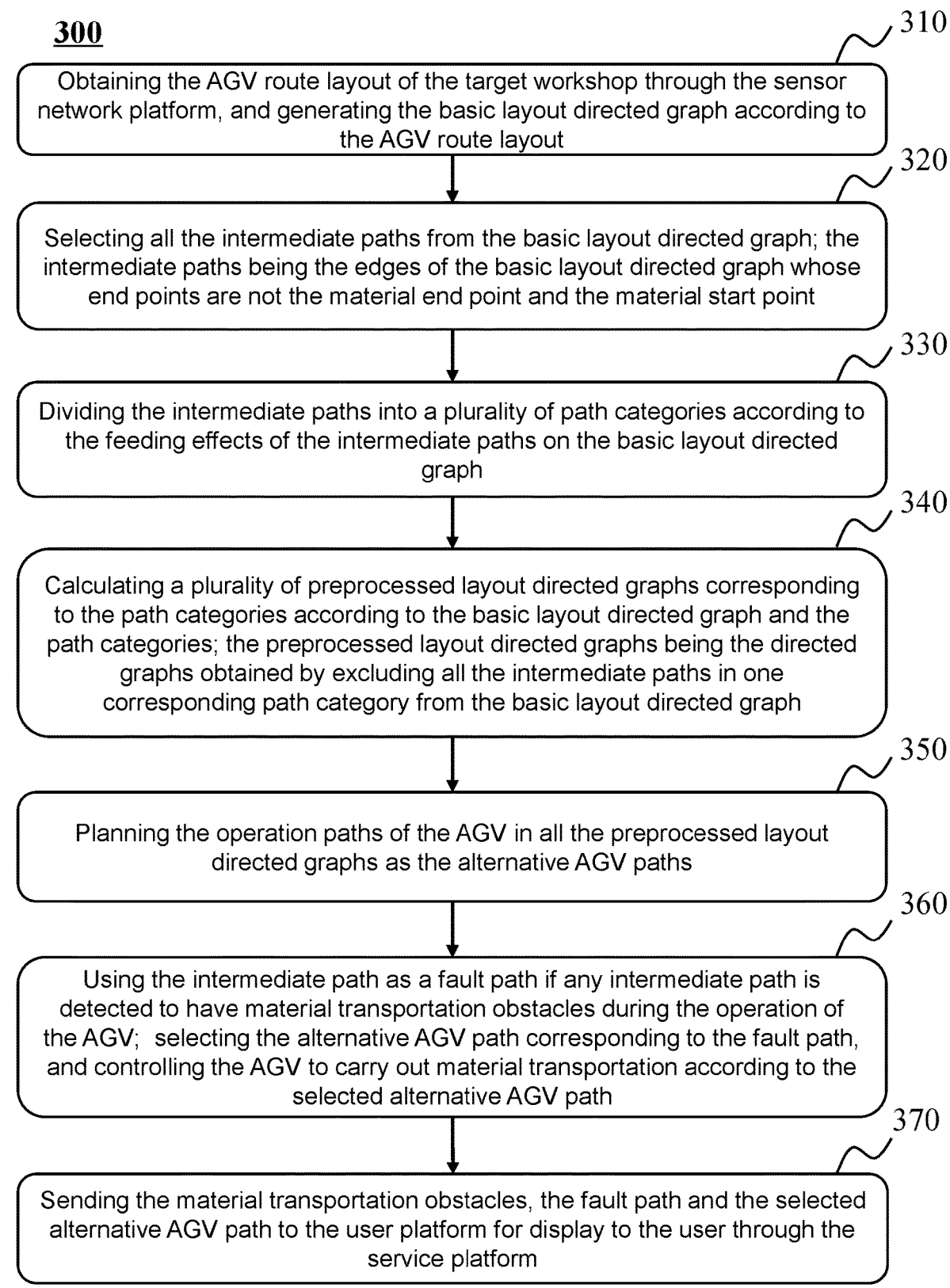
FIG. 3 is a schematic flowchart of steps of a control method of the industrial Internet of Things based on identification of material transportation obstacles according to some embodiments of the present disclosure.

On the basis of the above, please refer to FIG. 3, which is a schematic diagram of a process 300 of the control method of the industrial Internet of Things based on identification of material transportation obstacles according to the embodiments of the present disclosure. The control method of the industrial Internet of Things based on identification of material transportation obstacles may be applied to the industrial Internet of Things based on identification of material transportation obstacles in FIG. 2. Furthermore, the control method of the industrial Internet of Things based on identification of material transportation obstacles may specifically comprise the contents described in the following steps 310-370.

Step 310: obtaining the AGV route layout of the target workshop through the sensor network platform, and generating the basic layout directed graph according to the AGV route layout;

Step 320: selecting all the intermediate paths from the basic layout directed graph; the intermediate paths being the edges of the basic layout directed graph whose end points are not the material end point and the material start point;

Step 330: dividing the intermediate paths into a plurality of path categories according to the feeding effects of the intermediate paths on the basic layout directed graph;

Step 340: calculating a plurality of preprocessed layout directed graphs corresponding to the path categories according to the basic layout directed graph and the path categories; the preprocessed layout directed graphs being the directed graphs obtained by excluding all the intermediate paths in one corresponding path category from the basic layout directed graph;

Step 350: planning the operation paths of the AGV in all the preprocessed layout directed graphs as the alternative AGV paths;

Step 360: using the intermediate path as a fault path if any intermediate path is detected to have material transportation obstacles during the operation of the AGV; selecting the alternative AGV path corresponding to the fault path, and controlling the AGV to carry out material transportation according to the selected alternative AGV path;

Step 370: sending the material transportation obstacles, the fault path and the selected alternative AGV path to the user platform for display to the user through the service platform.

In one possible embodiment, the classifying the intermediate paths into a plurality of path categories according to the feeding effects of the intermediate paths on the basic layout directed graph comprises:

obtaining the shortest distance between the intermediate paths and all key nodes in the basic layout directed graph as a feature array corresponding to the intermediate paths; the key nodes comprising the material end point and the material start point; and performing cluster analysis on all the intermediate paths according to the feature array to divide the intermediate paths into a plurality of path categories.

Ordinary technicians skilled in the art can realize that the units and algorithm steps of each example described in conjunction with the embodiments disclosed herein can be implemented in electronic hardware, computer software, or a combination of the two. In order to clearly illustrate the interchangeability of hardware and software, the components and steps of each example have been generally described in terms of functions in the foregoing description. Whether these functions are performed in hardware or software depends on the specific application and design constraints of the technical schemes. The Skilled technicians may implement the described functions using different methods for each particular application, but such implementations should not be considered beyond the scope of the present disclosure.

In the plurality of embodiments provided in this disclosure, it should be understood that the disclosed device and method may be implemented in other manners. For example, the device embodiments described above are only illustrative. For example, the division of the units is only a logical function division. In actual implementation, there may be other division methods. For example, a plurality of units or components may be combined or may be integrated into another system, or some features can be ignored, or not implemented. In addition, the shown or discussed mutual coupling or direct coupling or communication connection may be indirect coupling or communication connection through some interfaces, devices or units, and may also be electrical, mechanical or other forms of connection.

The unit described as a separate component may or may not be physically separated. As a unit, it is obvious that ordinary technicians skilled in the art can realize that the unit and algorithm steps of each example described in conjunction with the embodiments disclosed herein can be used and it is implemented by electronic hardware, computer software or a combination of the two. In order to clearly illustrate the interchangeability of hardware and software, the above description has generally described the components and steps of each example in terms of functions. Whether these functions are performed in hardware or software depends on the specific application and design constraints of the technical scheme. Skilled tehnicians may implement the described functions using different methods for each particular application, but such implementations should not be considered beyond the scope of the present disclosure.

In addition, each functional unit in each embodiment of the present disclosure may be integrated into one processing unit, or each unit may exist physically alone, or two or more units may be integrated into one unit. The above-mentioned integrated unit may be implemented in the form of hardware, or may be implemented in the form of software functional units.

The integrated unit, if implemented in the form of a software functional unit and sold or used as an independent product, may be stored in a computer readable storage medium. Based on this understanding, the technical schemes of the present diclosure are essentially or parts that contribute to the prior art, or all or part of the technical schemes can be embodied in the form of software products. The computer software product is stored in a storage medium, and includes several instructions for causing a computer device (which may be a personal computer, a server, or a grid device, etc.) to execute all or part of the steps of the methods described in various embodiments of the present disclosure. The aforementioned storage medium includes: a U disk, a mobile hard disk, a Read-Only Memory (ROM), a Random Access Memory (RAM), a magnetic disk or an optical disk and other media that can store program codes.

The specific embodiments described above further describe the objectives, technical schemes and beneficial effects of the present disclosure in detail. It should be understood that the above are only specific embodiments of the present disclosure, and are not intended to limit the protection scope of the present disclosure. Any modification, equivalent replacement, improvement made within the spirit and principle of the present disclosure etc., should be included within the protection scope of the present disclosure.

Figure 4:
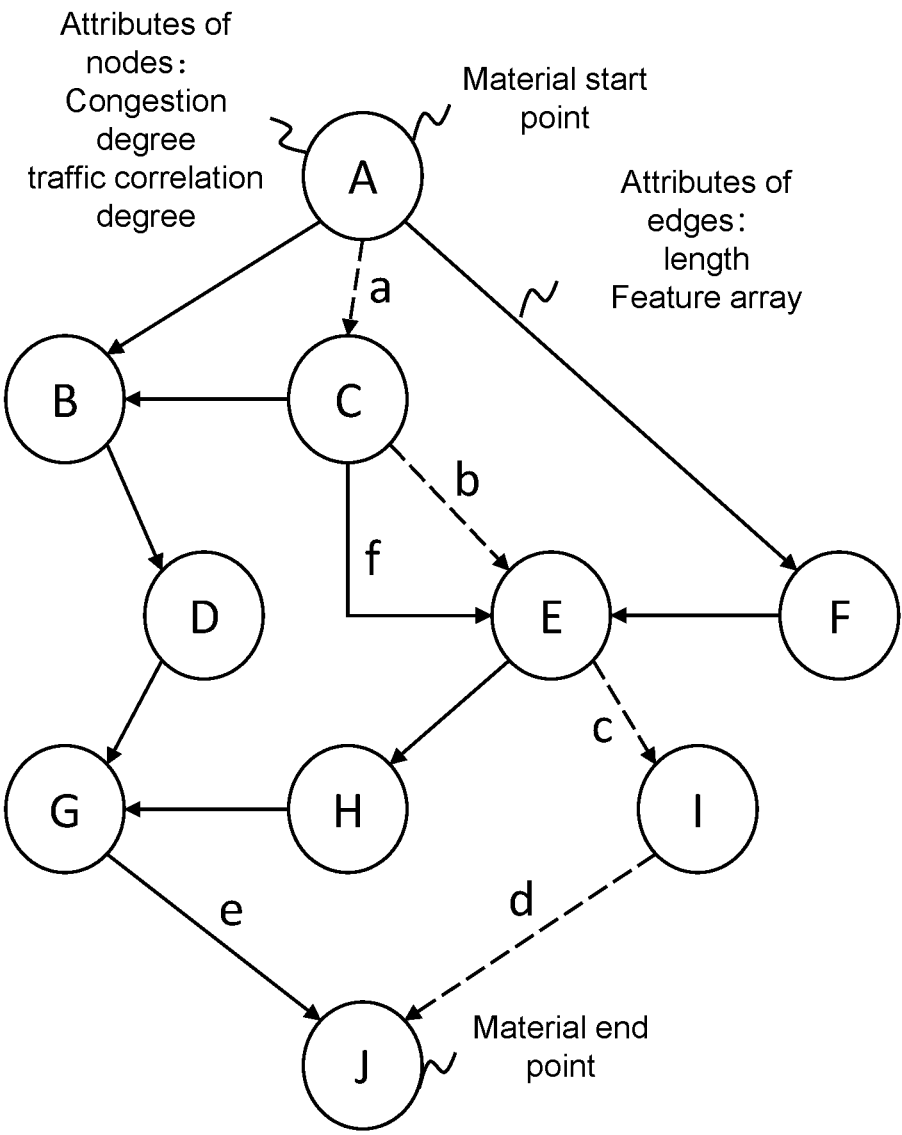
FIG. 4 is an exemplary schematic diagram of determining an optimal AGV path according to some embodiments of the present disclosure.

FIG. 4 is an exemplary schematic diagram of determining the optimal AGV path according to some embodiments of the present disclosure.

In some embodiments, the target AGV path comprises the optimal AGV path, and the processor may determine the optimal AGV path through a preset algorithm based on the basic layout directed graph. For more contents about the target AGV path and the basic layout directed graph, please refer to FIG. 1 and related description thereof.

In some embodiments, the basic layout directed graph consists of nodes and edges, the nodes comprise the intersection points of the AGV routes, the material start point and the material end point, and the attributes of each the nodes comprise the congestion degree and the traffic correlation degree. The edges comprise the start path, the terminal path and the intermediate paths, and the attributes of each of the edges comprise the length and the feature array.

The nodes are points where materials are loaded or unloaded and where the edges intersect during material transportation, such as the material start point, the material end point, the intersection points of the AGV routes, etc., and the material start point A, the material end point J, the intersection point C of the AGV routes, the intersection point F of the AGV routes, etc. shown in FIG. 4.

The attributes of the nodes refer to information related to material transportation contained in the nodes, such as the congestion degrees, the traffic correlation degrees, etc.

The congestion degree of a node refers to a value that can reflect the number of AGV transport vehicles passing through the node in unit time. The greater the number of AGV transport vehicles passing through the node in a unit time is, the greater the congestion degree is, and the more serious the congestion degree of the node is. For example, the congestion degree of a certain node may be 1 vehicle/min.

In some embodiments, the processor may determine the congestion degree of the node based on an ongoing and/or pending transportation plan executed by the management platform. For example, the processor may determine that the number of the AGV transport vehicles passing through the node in the next 10 minutes is 10 according to the pending transportation plan, and the congestion degree of the node is 1 vehicle/min.

The traffic correlation degree of a node refers to a value that can reflect the number of edges connected to the node and other nodes. In some embodiments, the traffic correlation degree may be expressed as a percentage, and the higher the percentage is, the higher the traffic correlation degree is. For example, the traffic correlation degree of a node A may be 90%. As another example, the traffic correlation degree of the node A may be 90%, and the traffic correlation degree of a node B may be 80%, then the traffic correlation degree of the node A is greater than the traffic correlation degree of the node B.

In some embodiments, the processor may organize the traffic correlation degree of a preset node and the number of edges connected to other nodes into a data comparison table, and determine the traffic correlation degree based on the data comparison table. For example, in the data comparison table, when the number of edges connected to other nodes is 2, the corresponding traffic correlation degree is 20%. If, as shown in FIG. 4, the number of edges connected to a node F and other nodes is 2, then the traffic correlation degree of the node F is 20%.

In some embodiments, the processor may determine the traffic correlation degree of the node through a first iteration approach. For more contents about the first iteration approach, please refer to FIG. 5 and related description thereof.

An edge refers to an AGV route connecting two nodes. For example, the processor may classify the edges into a start path, a terminal path, intermediate paths, etc. based on the different types of the connected nodes. The start path may refer to an edge whose start endpoint is the material start point, such as an edge a connecting the node A and the node C shown in FIG. 4. The terminal path may refer to an edge whose terminal endpoint is the material end point, such as an edge d connecting the node I and the node J shown in FIG. 4, or an edge e connecting the node G and the node J shown in FIG. 4. The intermediate paths may refer to edges whose endpoints are the intersection points of the AGV routes, such as an edge b connecting the node C and the node E shown in FIG. 4, and an edge c connecting the node E and the node I shown in FIG. 4.

The attributes of the edge refer to the information related to material transportation contained in the edge, such as the length, the feature array, etc.

The length refers to the distance from node to node. For example, the length of the edge a connecting the node A and the node C shown in FIG. 4 is 3 km.

The feature array refers to an array composed of the shortest distances between the intersection points of the AGV routes and all the material start points and material end points. For more contents about the feature array, please refer to FIG. 2 and FIG. 3 and related description thereof.

The optimal AGV path refers to the most efficient transportation path from the material start point to the material end point during the material transportation process. The most efficient transportation path refers to a path with the shortest time required from the material start point to the material end point during the material transportation process. For example, the path a-b-c-d shown in FIG. 4 may be the optimal AGV path.

The preset algorithm refers to a preset method used to determine the optimal AGV path in the material transportation process, such as cluster analysis, an iteration algorithm, an ant colony algorithm, etc.

In some embodiments, the processor may use various feasible algorithms, such as the iteration algorithm, the ant colony algorithm, etc., to process the basic layout directed graph to determine the optimal AGV path.

In some embodiments, the processor may process the basic layout directed graph through a second iteration approach. The optimal AGV path is determined based on the final pheromone of all the nodes and the final pheromone of all the edges. For more contents about the second iteration approach, the pheromone of the nodes and the pheromone of the edges, please refer to FIG. 6 and related description thereof.

In some embodiments of present disclosure, the optimal AGV path in material transportation is determined by processing the congestion degree, traffic correlation degree, the length, and the feature array included in the basic directed graph. The efficiency and the accuracy of predicting the optimal AGV path can be improved and the orderly progress of material transportation can be guaranteed.

Figure 5:
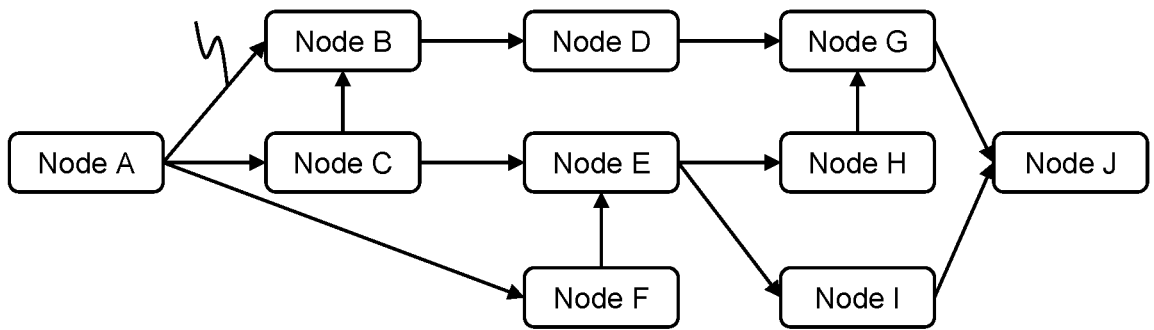
FIG. 5 is an exemplary schematic diagram of an iteration process for determining a traffic correlation degree according to some embodiments of the present disclosure.

FIG. 5 is an exemplary schematic diagram of an iteration process for determining the traffic correlation degree according to some embodiments of the present disclosure.

The processor may determine the traffic correlation degree of the node through the first iteration approach, the first iteration approach comprising at least one round of first iteration; and take each node in the basic layout directed graph as a target node to: in the first round of iteration, determine a traffic correlation degree to be updated of the target node in the next round of iteration based on the total number of nodes in the basic layout directed graph, the number of first connected nodes connected to the target node, and the traffic correlation degree to be updated of the first connected nodes in the first round of iteration, the traffic correlation degree to be updated in the first round of iteration being determined according to the total number of nodes; and in each subsequent round of iterations, determine the traffic correlation degree of the target node in the next round of iteration based on the total number of nodes, the number of the first connected nodes, and the traffic correlation degree to be updated of the first connected nodes in this round of iteration, the first connected nodes referring to nodes directly connected to the target node.

In some embodiments, the traffic correlation degree of each node in the basic layout directed graph may be obtained through a plurality of rounds of iteration updating. For the convenience of description, the specific contents of iteratively updating the traffic correlation degree will be described below.

In some embodiments, an initial traffic correlation degree of each node in the basic layout directed graph may be determined from the total number of nodes in the basic layout directed graph. For example, the initial traffic correlation degree of each node in the basic layout directed graph may be one fraction of the total number of nodes. The initial traffic correlation degree of each node in the basic layout directed graph is the traffic correlation degree of the first round of iteration.

In some embodiments, the processor may use each node in the basic layout directed graph as the target node to perform the following operations, each node in the basic layout directed graph being used as the target node in each round of iteration:

in the first round of iteration, determining the traffic correlation degree to be updated of the target node in the next round of iteration for the target node based on the total number of nodes, the number of the first connected nodes connected to the target node, and the traffic correlation degrees to be updated of the first connected nodes in the first round of iteration. The total number of nodes may refer to the total number of nodes in a knowledge graph, and the number of the first connected nodes may refer to the total number of all nodes directly connected to the node.

In some embodiments, the traffic correlation degree to be updated of the first connected nodes in the first round of iteration (i.e., the initial traffic correlation degree of the first connected nodes) may be determined according to the total number of nodes in the knowledge graph.

Exemplarily, in the first round of iteration, that is, at time t=0, the traffic correlation degree to be updated of node i in the first round of iteration may be calculated by the following formula (1):

$$PR(p_i;0)=1/N \qquad (1)$$

where N represents the total number of nodes in the knowledge graph, $p_i$; 0 represents the node i at time t=0, and $PR(p_i; 0)$ represents the traffic correlation degree to be updated of the node at time t=0 (i.e., the initial traffic correlation degree).

In each subsequent round of iteration, for the target node, the traffic correlation degree to be updated of the target node in the next round of iteration is determined based on the total number of nodes, the number of the first connected nodes, and the traffic correlation degree to be updated of the first connected node in this round of iteration.

Exemplarily, in each subsequent round of iteration, that is, at time t+1, the traffic correlation degree to be updated of the target node may be calculated by the following formula (2):

$$PR(p_i; t+1) = \frac{1-d}{N} + d\sum\nolimits_{p_j \in M(p_i)} \frac{w(p_i, p_j)PR(p_j; t)}{\text{degree}(p_j)} \qquad (2)$$

where d of $$\frac{1-d}{N}$$

(hereinafter referred to as the first part of formula (2)) is a preset damping coefficient;

$$\text{degree}(p_j) \text{ of } d\sum\nolimits_{p_j \in M(p_i)} \frac{w(p_i, p_j)PR(p_j; t)}{\text{degree}(p_j)}$$

(hereinafter referred to as the second part of formula (2)) is the degree of the first connected nodes j, used to represent the number of edges directly connected to the first connected nodes j, M ($p_i$) is a set of nodes connected to the target node, w($p_i$, $p_j$) represents the weight, PR($p_j$; t) represents the traffic correlation degree to be updated of the first connected nodes connected to the target node at time t, PR($p_i$; t+1) represents the traffic correlation degree to be updated of the target node at time t+1, and the second part of formula (2) represents the weighted sum of the traffic correlation degrees to be updated of all the first connected nodes j connected to the target node.

In some embodiments, the weights involved in the above formula (2) may be determined based on edge features (e.g., length, feature array) of the connected edges. In some embodiments, the sum of elements in the length and the feature array is negatively correlated with the value of the weight. For example, if the sum of elements in the length and the feature array is a and b, respectively, the weight may be calculated by the following formula (3):

$$w(p_i, p_j) = 1/(a*k_1 + b*k_2) \quad (3)$$

where $k_1$, $k_2$ are preset weight coefficients.

In some embodiments, the above weights are not limited to the calculation methods mentioned in some embodiments of this disclosure, and may also be any other reasonable methods. For example, the relevant information of the paths and the intersection points of routes is obtained through a weight model formed by a neural network.

In some embodiments, the preset damping coefficient d, and the preset weight coefficients $k_1$, $k_2$ may be a system default value, an empirical value, a manually preset value, etc., or any combination thereof, and may be set according to actual needs, which is not limited in the present disclosure.

In some embodiments of the present disclosure, the weight is determined according to the actual impact of the length and the feature array on the traffic correlation degree, which can improve the accuracy of determining the traffic correlation degree.

In some embodiments, when the traffic correlation degree is iteratively updated, when the iteration does not meet a preset iteration end condition, the next round of iteration is continued. In some embodiments, when the traffic correlation degree is iteratively updated, and the iteration meets the preset iteration end condition, the iteration ends, and the traffic correlation degree to be updated of the target node in this round of iteration is the finally determined traffic correlation degree of the target node. The preset iteration end condition may be that the function converges, or the number of iterations reaches a threshold. In some embodiments, the preset iteration end condition may be that the sum of the absolute values of the differences of the traffic correlation degrees of all nodes at two adjacent moments is less than a preset threshold, and the preset condition may be represented by the following formula (4):

$$\Sigma_{p_i \in G} |PR(p_i; t+1) - PR(p_i; t)| < \varepsilon \quad (4)$$

where G represents a set composed of all nodes, $\varepsilon$ is a preset threshold.

The following is an exemplary process for determining traffic correlation degree through a plurality of rounds of iteration updating:

Step 1: at an initial time (t=0), the traffic correlation degree of each node may be initialized. An optional way is to determine the initial traffic correlation degree corresponding to the node before the iteration starts based on the above formula (1) and the total number of nodes in the knowledge graph.

Exemplarily, as shown in FIG. 5, there are 10 nodes in the knowledge graph (i.e., node A, node B, node C, node D, node E, node F, node G, node H, node I, and node J), then N=10, correspondingly, the initial traffic correlation degree of each node may be determined to be 0.1 according to the aforementioned formula (1). Next, the damping coefficient d and weight coefficients $k_1$, $k_2$ corresponding to the sum of elements in the length and the feature array may be preset, for example, d=0.2, $k_1$=0.6, $k_2$=0.4.

Step 2: in each subsequent round of iteration, the corresponding weight of each node may be calculated based on the aforementioned formula (3), and the updated traffic correlation degree of each node in this round may be calculated based on the aforementioned formula (2), and the updated traffic correlation degree of this round is used as the traffic correlation degree to be updated in the next round of iteration.

Exemplarily, as shown in FIG. 5, the following will take the iteration process corresponding to the calculation of the traffic correlation degree of the node A (i.e., taking the node A as the target node) when t=1 as an example, to illustrate the iteration updating of the traffic correlation degree.

First, the sum of elements in the length and the feature array of the nodes B, C, and F directly connected to the node A and the corresponding weight coefficients $k_1$=0.6 and $k_2$=0.4 may be substituted into formula (2) to determine the weight w($p_i$, $p_j$). For example, the weight of an edge A-B (i.e., the edge between the node A and the node B) may be: w($p_A$, $p_B$)=$a_1*k_1+b_1*k_2$, where, $a_1$ and $b_1$ correspond to the sum of elements in the length and the feature array of the edge A-B. The weight of an edge AC may be: w($p_A$, $p_C$)=$a_2*k_1+b_2*k_2$, where, $a_2$ and $b_2$ correspond to the sum of elements in the length and the feature array of the edge A-C. The weight of edge AF can be: w($p_A$, $p_D$)=$a_3*k_1+b_3*k_2$, where, $a_3$ and $b_3$ correspond to the length of edge AD and the sum of elements in the feature array.

Then, the total number of nodes of the knowledge graph and the preset damping coefficient may be substituted into formula (2), and the first part of formula (2) may be determined. For example, substituting N=10, d=0.2 into formula (2) to determine that the first part of formula (2) is 0.08.

Furthermore, the second part of formula (2) may be determined by substituting the traffic correlation degree to be updated PR($p_j$; t), the degree degree($p_j$), the weight w($p_i$, $p_j$), and damping coefficient d of each node obtained after the previous round of iteration into formula (2).

Exemplarily, when determining the degree degree($p_j$) of the first connected node j, j is B, and its degree degree($p_B$) is 3; j is C, and its degree degree($p_C$) is 3; j is F, and its degree degree($p_C$) is 2.

As shown in FIG. 5, the nodes B, C, and F are directly connected to the node A. The above-mentioned relevant parameters are substituted into formula (2) to determine that the second part of formula (2) is: {[(w($p_A$, $p_B$)×0.1)÷3]+[(w($p_A$, $p_C$)×0.1)÷3]+[(w($p_A$, $p_F$)×0.1)÷2]}×0.2. Thus, the traffic correlation degree of the node A after this round of updating may be determined based on the aforementioned formula (2), and the traffic correlation degree after this round of updating may be used as the traffic correlation degree to be updated in the next round of iteration.

Step 3: performing each subsequent round of iteration (t=2, t=3, . . . ) in sequence, until the preset iteration end condition is met, the iteration ends. For example, assuming that the preset threshold is 0.2. When t=10, the total number of nodes is 10, and the traffic correlation degree of each node is 0.4; when t=11, the traffic correlation degree of each node is 0.41. Then, the sum of the absolute values of the differences of the traffic correlation degrees of all nodes is 0.1, which is less than the preset threshold value of 0.2. Correspondingly, the iteration may end, and the system may take the traffic correlation degree of each node determined at t=11 as the final traffic correlation degree of each node.

In some embodiments of the present disclosure, the traffic correlation degree is determined by the first iteration approach, and the impact of the first connected nodes on the target node is considered, so that the obtained traffic correlation degree is more accurate.

Figure 6:
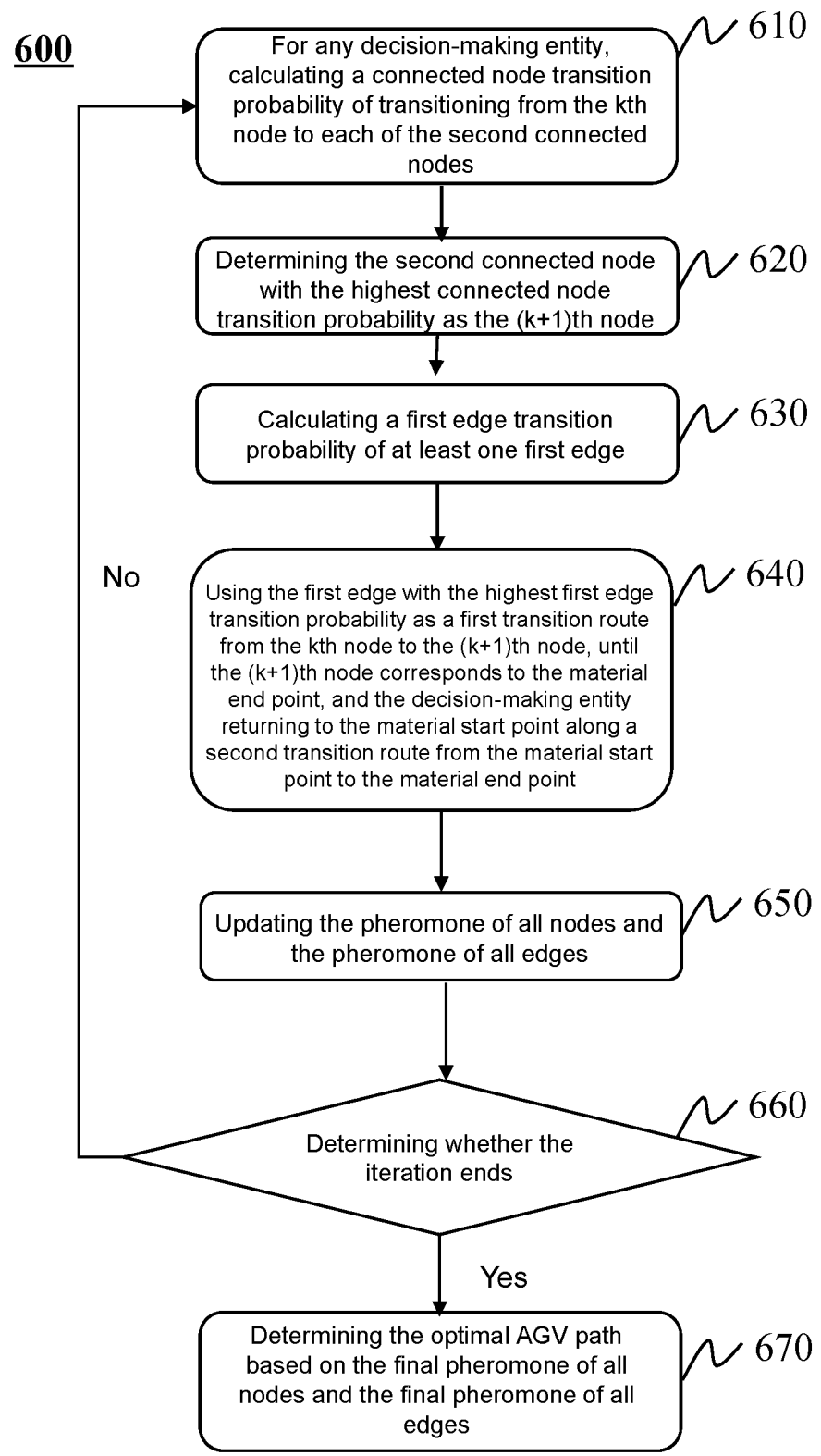
FIG. 6 is an exemplary flowchart of determining an optimal AGV path using a second iteration approach according to some embodiments of the present disclosure.

FIG. 6 is an exemplary flowchart of determining an optimal AGV path using the second iteration approach according to some embodiments of the present disclosure. In some embodiments, a process 600 may be performed by the determination module 120. As shown in FIG. 6, the process 600 comprises the following steps.

In some embodiments, the preset algorithm may comprise the second iteration approach, and the second iteration approach may comprise an ant colony algorithm. Some embodiments of the present disclosure improve the calculation of the transition probability. For details, please refer to the relevant descriptions of step 610 and step 630.

In some embodiments, the second iteration approach comprises at least one round of second iteration, one round of the at least one round of second iteration comprises at least one decision-making entity.

The decision-making entity refer to an entity with a path decision-making ability. For example, the decision-making entity may be a transport vehicle entity with the path decision-making ability.

Pheromone refer to a substance released by the decision-making entity to transmit information and attract other decision-making entities. The higher the pheromone concentration is, the higher the probability that the node or the edge is selected to be included in the optimal AGV path is. For example, in the process from the material start point A to the material end point J of the decision-making entity according to FIG. 4, the decision-making entity needs to choose to pass through the node B, the node C or the node F when starting from the material start point A. If the pheromone of the node C is higher, the more decision-making entities may be attracted to pass through the node C, the more decision-making entities that pass through the node C are, the more pheromone may stay in the node C. This cycle repeats, the greater the probability that the node C is finally included in the optimal AGV path is.

In some embodiments, the ant colony algorithm needs to initialize the population and parameters at the beginning, that is, the initial solution of the population is given according to the coding rules of the ant colony algorithm.

The parameters may include a population size, a pheromone volatilization rate, and a number of iterations. In some embodiments, the value of parameter initialization may be determined based on manual settings. For example, at the beginning of the ant colony algorithm, the population size is manually set to 50, the pheromone volatilization rate is 0.3, and the number of iterations is 100.

The parameters may also comprise a transportation target, such as the material start point, the material end point, material quantity, etc. In some embodiments, the value of the transportation target initialization may be determined based on user input. For example, as shown in FIG. 4, at the beginning of the ant colony algorithm, the user inputs to transport 10 kg of material from the material start point A to the material end point J.

In some embodiments, steps 610-670 may be executed for any decision-making entity to update the pheromone of all nodes and the pheromone of all edges. Thus, the optimal AGV path is determined based on the final pheromone of all nodes and the final pheromone of all edges.

Step 610, for any decision-making entity, calculating a connected node transition probability of transitioning from the kth node to each of the second connected nodes.

The kth node refers to any node other than the material end point in the basic layout directed graph. In some embodiments, k denotes an integer greater than or equal to 1, the first node corresponds to the material start point, and the kth node corresponds to at least one second connected node. For example, the node A shown in FIG. 4 is the first node. As another example, the node C shown in FIG. 4 is the second node, and the node B and the node E are the second connected nodes corresponding to the node C.

The second connected nodes refer to the next nodes connected to the kth node in the direction indicated by the kth node. The second connected nodes exclude the points that the decision-making entity has passed, and the first connected nodes comprise all nodes directly connected to the kth node (i.e., comprising the points that the decision-making entity has passed). For example, if the current decision-making entity is located at the node E, the second connected node may be the node H or the node I, and the second connected node may not be the node C or the node F. As another example, if the current decision-making entity is located on the edge c, the second connected node may be the node I, and the second connected node may not be the node E.

The connected node transition probability refers to a probability that the decision-making entity moves from the kth node to each of the second connected nodes. In some embodiments, each second connected node corresponds to a connected node transition probability. For example, the node C shown in FIG. 4 is the kth node, and the node B and the node E are the second connected nodes. The probability of the decision-making entity transitioning from the node C to the node B is 70%, and the probability of transitioning from the node C to the node E is 30%. Then the connected node transition probability of the node B is 70%, and the connected node transition probability of the node E is 30%.

In some embodiments, the processor may determine whether the second connected nodes have material transportation obstacles, and in response to the determination that the second connected nodes have material transportation obstacles, the connected node transition probability is set to 0; in response to the determination that the second connected nodes have no obstacle in material transportation, the connected node transition probability is determined based on the current pheromone of the second connected nodes, the congestion degree of the second connected nodes, and the traffic correlation degree of the second connected nodes.

The material transportation obstacles refer to situations that affect the normal operation of material transportation. For example, at the second connected nodes, there is a situation where the transport vehicle drops goods. As another example, at the second connected nodes, the presence of obstacles is identified by monitoring.

In some embodiments, an image processing technology may be used to determine whether there are material transportation obstacles at the second connected nodes. For example, image acquisition equipment (e.g., a camera, etc.) is installed at the second connected nodes. An image recognition technology is used to analyze whether there are obstacles in the image or whether there is an abnormal transportation situation, so as to determine whether there are material transportation obstacles at the second connected nodes. In some embodiments, it can be determined whether there are obstacles in material transportation at the second connected nodes through check feedback of the obstacle situation. For example, when the transport vehicles drops goods or in other abnormal situations, the transport vehicle sends transport abnormality feedback information to the management platform. As another example, a checkpoint is set at the second connected nodes, and if an obstacle or other abnormal transportation situation occurs, the checkpoint sends the transportation abnormality feedback information to the management platform.

In some embodiments, the connected node transition probability is automatically determined to be 0 in response to the occurrence of material transportation obstacles at the second connected nodes.

In some embodiments, the processor may process the current pheromone of the second connected nodes, the congestion degree of the second connected nodes, and the traffic correlation degree of the second connected nodes in response to the determination that the second connected nodes have no obstacle in material transportation, thereby determining the connected node transition probability. For example, the higher the current pheromone level of each of the second connected nodes is, the lower the congestion degree of each of the second connected nodes is, and the higher the traffic correlation degree of each of the second connected nodes is, the greater the connected node transition probability is.

In some embodiments, the processor may organize the current pheromone level of the second connected nodes, the congestion level of the second connected nodes, and the traffic correlation degree of the second connected nodes and the connected node transition probability into a data comparison table in response to the determination that the second connected nodes have no obstacle in material transportation, and determine the connected node transition probability based on the data comparison table. For example, in the data comparison table, when the current pheromone level of the second connected nodes is 30%, the congestion degree of the second connected nodes is 20%, and the traffic correlation degree of the second connected nodes is 25%, the corresponding connected node transition probability is 28%. If the current pheromone level of the second connected nodes of a certain node is 30%, the congestion degree of the second connected nodes is 20%, and the traffic correlation degree of the second connected nodes is 25%, then the connected node transition probability of this node is 28%.

In some embodiments of present disclosure, by calculating the connected node transition probability, a new AGV path plan may be determined in time in the event of material transportation obstacles. The connected node transition probability is determined by processing the congestion degree of the second connected nodes. When the congestion degree of a certain second connected node is high, other second connected nodes may be preferentially selected, thereby improving the efficiency of material transportation and avoiding overcrowding of material transportation paths leading to AGV transport vehicle crashes and other situations. By processing the traffic correlation degree of the second connected nodes to determine the connected node transition probability, it can be determined that when the traffic correlation degree of a certain second connected node is high, even if the node encounters an obstacle, there may be more other path options, thereby improving the rationality of AGV path planning.

Step 620: determining the second connected node with the highest connected node transition probability as the (k+1)th node.

The (k+1)th node refers to the second connected node with the highest connected node transition probability among the second connected nodes connected to the kth node. For example, as shown in FIG. 4, the connected node transition probability of the node B is 70%, and the connected node transition probability of the node E is 30%, then the node B is the (k+1)th node.

In some embodiments, the kth node to the (k+1)th node are connected by at least one first edge.

The first edge refers to an edge connecting the kth node and the (k+1)th node. For example, the node C shown in FIG. 4 is the kth node, and the node E is the (k+1)th node, then the edge b and the edge f are the first edge.

Step 630: calculating a first edge transition probability of at least one first edge.

The first edge transition probability refers to the probability that the decision-making entity chooses the first edge to transition from the kth node to the (k+1)th node. In some embodiments, each first edge corresponds to a first edge transition probability.

In some embodiments, the processor may determine whether an obstacle in material transportation occurs on the first edge; in response to the determination that the obstacle in material transportation occurs on the first edge, the first edge transition probability is set to 0; in response to the determination that the obstacle in material transportation does not occur on the first edge, the first edge transition probability is determined based on the current pheromone of the first edge, and the length of the first edge.

In some embodiments, in response to the determination that the obstacle in material transportation occurs on the first edge, the first edge transition probability is automatically determined to be 0.

In some embodiments, in response to the determination that the obstacle in material transportation does not occur on the first edge, the processor may process the current pheromone of the first edge and the length of the first edge to determine the first edge transition probability. For example, the higher the current pheromone level of the first edge is and the smaller the length of the first edge is, the greater the first edge transition probability is.

In some embodiments, in response to the determination that the obstacle in material transportation does not occur on the first edge, the processor may organize the current pheromone level of the first edge and the length of the first edge and the first edge transition probability into a data comparison table, and determine the first edge transition probability based on the data comparison table. For example, in the data comparison table, when the current pheromone of the first edge is 30%, and the length of the first edge is 7 km, the corresponding first edge transition probability is 25%. As shown in FIG. 4, if the current pheromone of the first edge a is 30% and the length of the first edge a is 7 km, then it can be determined that the transition probability of the first edge a is 25% based on the data comparison table.

In some embodiments of this specification, by calculating the first edge transition probability, a new AGV path plan may be determined in time in the event of material transportation obstacles; by processing the current pheromone of the first edge to determine the first edge transition probability, it can ensure the rationality of including the edge in the optimal AGV path, thereby improving the efficiency of AGV path planning; by processing the length of the first edge to determine the first edge transition probability, and comprehensively considering the distance of the material transportation path, the distance of material transportation can be shortened on the premise of ensuring the orderly transportation of materials. The efficiency of material transportation is improved and transportation resources is also saved.

In some embodiments, the edges may also be clustered based on the feature array of the edges. When there is an obstacle in material transportation on one edge of a cluster, the first edge transition probability of all the first edges of the cluster is 0.

For more contents about the feature array and clustering, please refer to FIG. 2 and FIG. 3 and related description thereof.

In some embodiments of present disclosure, in the event of too many selections of edges, clustering the edges based on the feature array to determine the first edge transition probability may improve the efficiency of the algorithm.

Step 640, using the first edge with the highest first edge transition probability as a first transition route from the kth node to the (k+1)th node, until the (k+1)th node corresponds to the material end point, and the decision-making entity returning to the material start point along a second transition route from the material start point to the material end point.

The first transition route refers to the first edge with the highest first edged transition probability among all the edges connecting the kth node and the (k+1)th node. For example, the first edge transition probability of the first edge b shown in FIG. 4 is 70%, and the first edge transition probability of the first edge f is 30%, then the first transition route connecting the node C and the node E is the first side b.

The second transition route refers to a route composed of the first transition route that connects the material start point and the material end point. In some embodiments, the second transition route is composed of the first transition route. For example, the first transition route from the node A to the node C shown in FIG. 4 is a, the first transition route from the node C to the node E is b, the first transition route from the node E to the node I is c, and the first transition route from the node I to the node J is d, and the second transition route is a-b-c-d.

Step 650, updating the pheromone of all nodes and the pheromone of all edges.

In some embodiments, the pheromone is the marking information left by the decision-making entity when passing through the second transition route, the pheromone of the nodes is used to determine the connected node transition probability, and the pheromone of the edges is used to determine the first edge transition probability. In some embodiments, the processor may determine the pheromone of the nodes or the pheromone of the edges based on the amount of the marking information left when the decision-making entity passes through the nodes or the edges. In some embodiments, any decision-making entity leaves the same amount of marking information each time it passes through each node/edge. The marking information that the decision-making entity left on the node or the edge may be uploaded to storage. When the processor needs to update the pheromone of the node and the pheromone of the edge, determine the connected node transition probability or determine the first edge transition probability, the processor may retrieve the amount of marking information of the node or edge in the storage to determine the pheromone of the node/edge.

In some embodiments, the pheromone of the node is determined based on the sum of the pheromone left by all decision-making entities at the node and the pheromone volatilization rate. The pheromone volatilization rate is determined during the initialization process based on the population and the parameters. For example, as shown in FIG. 4, there are 10 decision-making entities passing through the node C, and the pheromone left by each decision-making entity at the node C is 10, and the pheromone volatilization rate of the node C is 10%. Then the updated pheromone of the node C is 10×10×(1-10%)=90.

In some embodiments, the pheromone of the edge is determined based on the sum of the pheromone left by all decision-making entities on the edge and the pheromone volatilization rate. The pheromone volatilization rate is determined during the initialization process based on the population and the parameters. For example, as shown in FIG. 4, there are 10 decision-making entities passing through the edge b. The pheromone left by each decision-making entity on the edge b is 20, and the pheromone volatilization rate of the edge b is 20%. Then the updated pheromone of the edge b is 20×10×(1-20%)=160.

Step 660, determining whether the iteration ends.

One round of iteration means that all decision-making entities included in the initialization population go from the material start point to the material end point through the second transition route, and then return to the material start point along the second transition route. For example, if one round of iteration comprises 3 decision-making entities (i.e., decision-making entity 1, decision-making entity 2, and decision-making entity 3). Then the decision-making entity 1 starts from the material start point A, and then returns to the material start point A through the node B, the node D, the node G, the node J, the node G, the node D, and the node B in sequence; the decision-making entity 2 starts from the material start point A, and then returns to the material start point A through the node C, the node E, the node I, the node J, the node I, the node E, and the node C in sequence; the decision-making entity 3 starts from the material start point A, and then returns to the material start point A through the node F, the node E, the node I, the node J, the node I, the node E, and the node F in sequence. After completion, one round of iteration ends. In some embodiments, each decision-making entity may select a path during each round of iteration based on the method of steps 610-640. In some embodiments, there may be more than or equal to two decision-making entities passing through the same path, from the material start point to the material end through the second transition route, and then returning to the material start point along the second transition route.

In some embodiments, the processor may determine whether the iteration ends based on a preset condition. The preset condition may include reaching a predetermined number of iterations or the difference between the results of two rounds of iterations being less than a preset value, and the like. For example, the preset condition may be that the number of iterations reaches 100. For another example, as shown in FIG. 4, the nodes corresponding to the AGV path determined in the 90th round of iteration are node A, node C, node E, node I, and node J. The nodes corresponding to the AGV path determined in the 91st iteration are node A, node F, node E, node I, and node J. The different nodes included in the two AGV paths output by the two rounds of iteration results are node C and node E, and the number is 2, which is less than the preset threshold of 3, and the iteration ends. For another example, as shown in FIG. 4, the edge corresponding to the AGV path determined in the 95th round of iteration is abcd. The edge corresponding to the AGV path determined in the 96th iteration is afcd. The different edges included in the two AGV paths output by the two rounds of iteration results are b and f, and the number is 2, which is less than the preset threshold of 3, and the iteration ends.

In some embodiments, in response to the determination that the maximum number of iterations has not been reached or that the difference between the results of the two rounds of iterations is greater than or equal to a preset value, the processor may repeatedly perform steps 610-660. In some embodiments, in response to the determination that the maximum number of iterations has not been reached or the difference between the results of the two rounds of iterations is greater than or equal to the preset value, each decision-making entity immediately starts to perform steps 610-660 after returning to the material start point. It is not that all decision-making entities in this round of iteration process return to the material start point before starting to perform steps 610-660.

In some embodiments, in response to the determination that the maximum number of iterations has been reached or the difference between the results of the two rounds of iterations is less than the preset value, the processor may perform step 670 to determine the optimal AGV path.

Step 670: determining the optimal AGV path based on the final pheromone of all nodes and the final pheromone of all edges.

In some embodiments, various feasible algorithms may be used to process the final pheromone of all nodes and the final pheromone of all edges, so as to determine the optimal AGV path.

In some embodiments, the final pheromone of all nodes and the final pheromone of all edges may be summed. When the sum of the final pheromone of all nodes and the final pheromone of all edges on a certain path is the maximum value, the path is determined as the optimal AGV path.

The principle of determining the optimal AGV path based on the ant colony algorithm is as follows: when the length of a certain path is shorter relative to other paths, the congestion degree of nodes on this path relative to nodes on other paths is lower, and the traffic correlation degree is higher, the more decision-making entities pass through the unit time, and the more pheromone are accumulated on the path. And more pheromone may attract more decision-making entity to choose this path, and more decision-making entities may choose this path and accumulate more pheromone on this path after passing through this path. This cycle is repeated, and finally most decision-making entities choose the same path with the highest transportation efficiency, which is the optimal AGV path in the material transportation process.

In some embodiments of present disclosure, the ant colony algorithm is improved based on the transition probability. When using the ant colony algorithm to determine the optimal AGV path, the connected node transition probability and the first edge transition probability are introduced, and the specific transportation situation of each node and each edge in the transportation path is further considered. And the processing of each node and each edge is adjusted in real time according to the changes of the specific transportation situation, so that the new optimal AGV path can be determined in a timely and efficient manner when transportation obstacles occur during the material transportation process.

In some embodiments of present disclosure, the optimal AGV path is determined by processing the connected node transition probability nodes and the first edge transition probability. When determining the connected node transition probability, the congestion degree and the traffic correlation degree of nodes are considered, a more suitable AGV route may be selected to avoid collisions during material transportation, and the selectivity of paths may be increased; when determining the first edge transition probability of the connected node transition probability, the route planning in the event of obstacles in transportation is considered, which further ensures the orderly progress of material transportation. At the same time, the transition probability is divided into the connected node transition probability and the first edge transition probability, by distinguishing nodes from edges, the next node to be selected may be determined first, and then which edge to transition from may be determined, which improves the efficiency and accuracy of determining the optimal AGV path.

It should be noted that the above description about the process of determining the optimal AGV path is only for example and illustration, and does not limit the scope of application of this disclosure. For technicians skilled in the art, various corrections and changes can be made to the process of determining the optimal AGV path under the guidance of this disclosure. However, these corrections and changes are still within the scope of this disclosure.

The basic concepts have been described above. Obviously, for technicians skilled in the art, the above detailed disclosure is merely an example, and does not constitute a limitation of the present disclosure. Although not explicitly described herein, various modifications, improvements, and corrections to this disclosure may occur to technicians skilled in the art. Such modifications, improvements, and corrections are suggested in this disclosure, so such modifications, improvements, and corrections still belong to the spirit and scope of the exemplary embodiments of this disclosure.

Meanwhile, the present disclosure uses specific words to describe the embodiments of the present disclosure. Examples such as "one embodiment," "an embodiment," and/or "some embodiments" mean a certain feature, structure, or characteristic associated with at least one embodiment of this disclosure. Therefore, it should be emphasized and noted that two or more references to "an embodiment" or "one embodiment" or "an alternative embodiment" in various places in this disclosure are not necessarily referring to the same embodiment. Furthermore, certain features, structures or characteristics of the one or more embodiments of this disclosure may be combined as appropriate.

Furthermore, unless explicitly stated in the claims, the order of processing elements and sequences described in this disclosure, the use of alphanumerics, or the use of other names is not intended to limit the order of the processes and methods of this disclosure While the foregoing disclosure discusses by way of various examples some embodiments of the invention that are presently believed to be useful, it is to be understood that such details are for purposes of illustration only and that the appended claims are not limited to the disclosed embodiments, rather, the claims are intended to cover all modifications and equivalent combinations falling within the spirit and scope of the embodiments of this disclosure. For example, although the system components described above may be implemented by hardware devices, they may also be implemented by software-only solutions, such as installing the described systems on existing servers or mobile devices.

Similarly, it should be noted that, in order to simplify the expressions disclosed in this disclosure and thus help the understanding of one or more embodiments of the disclosure, in the foregoing description of the embodiments of this disclosure, various features may sometimes be combined into one embodiment, in the drawings or descriptions thereof. However, this method of disclosure does not imply that the subject matter of the description requires more features than are recited in the claims. Rather, claimed subject matter may lie in less than all features of a single foregoing disclosed embodiment.

Some examples use numbers to describe quantities of ingredients and attributes, it should be understood that such numbers used to describe the examples, in some examples, use the modifiers "about", "approximately" or "substantially" to retouch. Unless stated otherwise, "about", "approximately" or "substantially" means that a variation of ±20% is allowed for the stated number. Accordingly, in some embodiments, the numerical parameters set forth in the disclosure and claims are approximations that can vary depending upon the desired characteristics of individual embodiments. In some embodiments, the numerical parameters should take into account the specified significant digits and use a general digit retention method. Notwithstanding that the numerical fields and parameters used in some embodiments of this disclosure to confirm the breadth of their ranges are approximations, in specific embodiments such numerical values are set as precisely as practicable.

For each patent, patent application, patent application publication, and other material, such as an article, a book, a specification, a publication, a document, etc., cited in this disclosure, the entire contents of which are hereby incorporated into this disclosure by reference. Application history documents that are inconsistent with or conflict with the contents of this disclosure are excluded, as are documents (currently or hereafter appended to this disclosure) limiting the broadest scope of the claims of this disclosure It should be noted that, if there is any inconsistency or conflict between the descriptions, definitions and/or use of terms in the accompanying materials of this disclosure and the contents of this disclosure, the descriptions, definitions and/or use of terms in this disclosure shall prevail.

Finally, it should be understood that the embodiments described in this disclosure are only used to illustrate the principles of the embodiments of this disclosure. Other variations are also possible within the scope of this disclosure. Therefore, by way of example and not limitation, alternative configurations of the embodiments of this disclosure may be considered consistent with the instructions of this disclosure. Accordingly, the embodiments of this disclosure are not limited to the embodiments expressly introduced and described in this disclosure.

What is claimed is:

1. An industrial Internet of Things for determining a target automatic guided vehicle (AGV) path, comprising a user platform, a service platform, a management platform, and a sensor network platform which are connected in sequence, wherein the management platform comprises:
    an obtaining module configured to obtain an AGV route layout of a target workshop through the sensor network platform, and generate a basic layout directed graph according to the AGV route layout; and
    a determination module configured to:
        determine, based on the basic layout directed graph, an optimal AGV path through a second iteration approach; the second iteration approach including at least one round of second iteration, one round of the at least one round of second iteration including at least one decision-making entity, and one round of the at least one round of second iteration including:
            for any decision-making entity,
                determining, based on a transportation obstacle situation when moving from a kth node to second connected nodes, a connected node transition probability from the kth node to each of the second connected nodes, where k denotes an integer greater than or equal to 1, a first node corresponds to a material start point, the kth node corresponds to at least one of the second connected nodes, the second connected nodes refers to next nodes connected to the kth node in a direction indicated by the kth node, the kth node refers to any node other than a material end point in a basic layout directed graph, the each of the second connected nodes corresponds to the connected node transition probability, and the each of the second connected nodes does not include a node that the decision-making entity has passed;
                determining a second connected node with a largest connected node transition probability as a (k+1)th node, the kth node to the (k+1)th node being connected by at least one first edge;
                determining, based on the transportation obstacle situation of the at least one first edge, a first edge transition probability of each of the at least one first edge;
                taking a first edge with a largest first edge transition probability as a first transition route of the kth node to the (k+1)th node until the (k+1)th node corresponds to a material end point, the decision-making entity returning to the material start point along a second transition route from the material start point to the material end point, the second transition route being composed of the first transition route;
                updating pheromone of all the nodes and pheromone of all the edges, the pheromone being mark information left by the decision-making entity when passing the second transition route, the pheromone of the nodes being used to determine the connected node transition probability, and the pheromone of the edges being used to determine the first edge transition probability; and
            after the second iteration, determining the optimal AGV path based on final pheromone of all the nodes and final pheromone of all the edges;
        generate the target AGV path at least based on the optimal AGV path; and
        control an AGV to carry out material transportation according to the target AGV path, and send the target AGV path to the user platform for display to a user through the service platform.

2. The Industrial Internet of Things of claim 1, wherein the determination module is further configured to:
    determine whether there are material transportation obstacles in the second connected nodes;
    in response to a determination that there are material transportation obstacles in the second connected nodes, set the connected node transition probability to 0; and
    for the each of the second connected nodes, in response to a determination that there is no material transportation obstacle in the second connected node, determine the connected node transition probability based on current pheromone of the second connected node, a congestion degree of the second connected node, and a traffic correlation degree of the second connected node.

3. The Industrial Internet of Things of claim 1, wherein the determination module is further configured to:
    determine whether there are material transportation obstacles in the at least one first edge;

in response to a determination that there are material transportation obstacles in the at least one first edge, set the first edge transition probability to 0; and in response to a determination that there is no material transportation obstacle in the at least one first edge, determine the first edge transition probability based on current pheromone of the first edge and a length of the first edge.

4. The Industrial Internet of Things of claim 1, wherein the basic layout directed graph is composed of nodes and edges, and the nodes include AGV route intersections, the material start point and the material end point, attributes of the nodes include congestion degrees and traffic correlation degrees of the nodes; and the edges include a start path, a terminal path, and intermediate paths, and attributes of the edges include lengths of the edges and a feature array.

5. The industrial Internet of Things of claim 4, wherein the determination module is further configured to determine the traffic correlation degree of the nodes by a first iteration approach, and the first iteration approach includes at least one round of first iteration; and each of the nodes in the basic layout directed graph is used as a target node, and the determination module is further configured to:

in a first round of the first iteration, determine a traffic correlation degree to be updated of the target node in a next round of the first iteration based on a total count of the nodes in the basic layout directed graph, a count of first connected nodes connected to the target node, and a traffic correlation degree to be updated of the first connected nodes in the first round of the first iteration, the traffic correlation degree to be updated in the first round of the first iteration being determined according to the total count of the nodes; and in each subsequent round of the first iteration, determine the traffic correlation degree to be updated in the next round of iteration of the target node based on the total count of the nodes, the count of the first connected nodes, and a traffic correlation degree to be updated of the first connected node in a current round of the first iteration.

6. The Industrial Internet of Things of claim 1, wherein the target AGV path includes alternative AGV paths, and the determination module further includes:

a selection module configured to select all intermediate paths from the basic layout directed graph, the intermediate paths being edges of the basic layout directed graph whose endpoints are not the material end point and the material start point;

a classification module configured to obtain shortest distances between each of the intermediate paths and all key nodes in the basic layout directed graph as a feature array corresponding to the each of the intermediate paths, the key nodes comprising the material end point and the material start point; and perform cluster analysis on all the intermediate paths according to the feature array to divide the intermediate paths into the plurality of path categories;

a calculation module configured to calculate a plurality of preprocessed layout directed graphs corresponding to the path categories according to the basic layout directed graph and the path categories, each of the preprocessed layout directed graphs being a directed graph obtained by excluding all intermediate paths corresponding to one of the path categories from the basic layout directed graph;

a planning module configured to plan operation paths of the AGV as the alternative AGV paths in all the preprocessed layout directed graphs;

a control module configured to use an intermediate path as a fault path if the intermediate path is detected to have material transportation obstacles during an operation of the AGV; select an alternative AGV path corresponding to the fault path, and control the AGV to carry out material transportation according to the selected alternative AGV path; and a communication module configured to send the material transportation obstacles, the fault path, and the selected alternative AGV path to the user platform for display to the user through the service platform.

7. The Industrial Internet of Things of claim 6, wherein the classification module is further configured to:

establish an intermediate node at a midpoint of the each of the intermediate paths; and calculate shortest distances between the intermediate node and all the key nodes, and mark all the shortest distances corresponding to the intermediate nodes according to numbers of the key nodes to form the feature array of the each of the intermediate paths.

8. The Industrial Internet of Things of claim 6, wherein the control module is further configured to:

monitor a load change of the AGV in operation;

when the load change exceeds a threshold and the AGV is not at the material end point and the material start point, determine that the AGV drops goods, and determine that an intermediate path where the AGV is currently located has material transportation obstacles; and when the AGV detects that there is an obstacle on an advancing route, determine that an intermediate path where the AGV is currently located has material transportation obstacles.

9. The industrial Internet of Things of claim 6, wherein the planning module is further configured to:

use an ant colony algorithm to plan an operation path of the AGV in all the preprocessed layout directed graph.

10. The industrial Internet of Things of claim 6, wherein the sensor network platform includes a plurality of mutually independent sensor network sub-platforms;

the sensor network sub-platforms are configured to obtain different types of data on the AGV and AGV routes and send the data to the management platform.

11. The industrial Internet of Things of claim 6, wherein the management platform includes a plurality of independent sub-servers;

the obtaining module, the selection module, the classification module, the calculation module, the planning module, the control module, and the communication module are all arranged in a same sub-server.

12. The Industrial Internet of Things of claim 6, wherein the service platform includes a general service platform and a plurality of service sub-platforms;

the service sub-platforms are configured to receive at least one of the material transportation obstacles, the fault path, and the selected alternative AGV path; and the general service platform is configured to aggregate all data collected by the service sub-platforms and send the data to the user platform.

13. A control method of an industrial Internet of Things for determining a target automatic guided vehicle (AGV) path, wherein the control method is implemented by a management platform of the industrial Internet of Things, and the control method comprises:

obtaining an AGV route layout of a target workshop through a sensor network platform, and generating a basic layout directed graph according to the AGV route layout;

determining, based on the basic layout directed graph, an optimal AGV path through a second iteration approach; the second iteration approach including at least one round of second iteration, one round of the at least one round of second iteration including at least one decision-making entity, and one round of the at least one round of second iteration including:

for any decision-making entity, determining, based on a transportation obstacle situation when moving from a kth node to second connected nodes, a connected node transition probability from the kth node to each of the second connected nodes, the second connected nodes refers to next nodes connected to the kth node in a direction indicated by the kth node, the kth node refers to any node other than a material end point in a basic layout directed graph, where k denotes an integer greater than or equal to 1, a first node corresponds to a material start point, the kth node corresponds to at least one of the second connected nodes, the each of the second connected nodes corresponds to the connected node transition probability, and the each of the second connected nodes does not include a node that the decision-making entity has passed;

determining a second connected node with a largest connected node transition probability as a (k+1)th node, the kth node to the (k+1)th node being connected by at least one first edge;

determining, based on the transportation obstacle situation of the at least one first edge, a first edge transition probability of each of the at least one first edge;

taking a first edge with a largest first edge transition probability as a first transition route of the kth node to the (k+1)th node until the (k+1)th node corresponds to a material end point, the decision-making entity returning to the material start point along a second transition route from the material start point to the material end point, the second transition route being composed of the first transition route;

updating pheromone of all the nodes and pheromone of all the edges, the pheromone being mark information left by the decision-making entity when passing the second transition route, the pheromone of the nodes being used to determine the connected node transition probability, and the pheromone of the edges being used to determine the first edge transition probability; and after the second iteration, determining the optimal AGV path based on final pheromone of all the nodes and final pheromone of all the edges;

generating the target AGV path at least based on the optimal AGV path; and controlling an AGV to carry out material transportation according to the target AGV path, and sending the target AGV path to the user platform for display to a user through the service platform.

14. The control method of claim 13, wherein determining the connected node transition probability includes:

determining whether there are material transportation obstacles in the second connected nodes;

in response to a determination that there are material transportation obstacles in the second connected nodes, setting the connected node transition probability to 0; and for the each of the second connected nodes, in response to a determination that there is no material transportation obstacle in the second connected node, determining the connected node transition probability based on current pheromone of the second connected node, a congestion degree of the second connected node, and a traffic correlation degree of the second connected node.

15. The control method of claim 13, wherein determining the first edge transition probability includes:

determining whether there are material transportation obstacles in the at least one first edge;

in response to a determination that there are material transportation obstacles in the at least one first edge, setting the first edge transition probability to 0; and in response to a determination that there is no material transportation obstacle in the at least one first edge, determining the first edge transition probability based on current pheromone of the first edge and a length of the first edge.

16. The control method of claim 13, wherein the basic layout directed graph is composed of nodes and edges, and the nodes include AGV route intersections, the material start point and the material end point, attributes of the nodes include congestion degrees and traffic correlation degrees of the nodes; and the edges include a start path, a terminal path, and intermediate paths, and attributes of the edges include lengths of the edges and a feature array.

17. The control method of claim 16, wherein the traffic correlation degree of the nodes is determined by a first iteration approach, and the first iteration approach includes at least one round of first iteration; and each of the nodes in the basic layout directed graph is used as a target node to perform operations including:

in a first round of the first iteration, determining a traffic correlation degree to be updated of the target node in a next round of the first iteration based on a total count of the nodes in the basic layout directed graph, a count of first connected nodes connected to the target node, and a traffic correlation degree to be updated of the first connected nodes in the first round of the first iteration, the traffic correlation degree to be updated in the first round of the first iteration being determined according to the total count of the nodes; and in each subsequent round of the first iteration, determining the traffic correlation degree to be updated in the next round of iteration of the target node based on the total count of the nodes, the count of the first connected nodes, and a traffic correlation degree to be updated of the first connected node in a current round of the first iteration.

18. The control method of claim 13, wherein the target AGV path includes alternative AGV paths, and the generating a target AGV path at least based on the optimal AGV path; and controlling an AGV to carry out material transportation according to the target AGV path, and sending the target AGV path to the user platform for display to the user through the service platform includes:

selecting all intermediate paths from a basic layout directed graph, the intermediate paths being edges of the basic layout directed graph whose endpoints are not the material end point and the material start point;

obtain shortest distances between each of the intermediate paths and all key nodes in the basic layout directed graph as a feature array corresponding to the each of the intermediate paths, the key nodes comprising the material end point and the material start point; and perform cluster analysis on all the intermediate paths according to the feature array to divide the intermediate paths into the plurality of path categories;

calculating a plurality of preprocessed layout directed graphs corresponding to the path categories according to the basic layout directed graph and the path categories, each of the preprocessed layout directed graphs being a directed graph obtained by excluding all intermediate paths corresponding to one of the path categories from the basic layout directed graph;

planning operation paths of the AGV as alternative AGV paths in all the preprocessed layout directed graphs;

using the intermediate path as a fault path if any intermediate path is detected to have material transportation obstacles during an operation of the AGV, selecting an alternative AGV path corresponding to the fault path, and controlling the AGV to carry out material transportation according to the selected alternative AGV path; and sending the material transportation obstacles, the fault path, and the selected alternative AGV path to the user platform for display to the user through the service platform.

19. A non-transitory computer readable storage medium, wherein the storage medium stores computer instructions, and when the computer instructions are executed by a processor, the control method of claim 13 is implemented.

* * * * *